3,591,644
PROCESS FOR PREPARING HALOGENATED AROMATICS
Vincent A. Notaro, Monroeville, and Charles M. Selwitz, Pitcairn, Pa., assignors to Gulf Research & Development Company, Pittsburgh, Pa.
No Drawing. Filed May 20, 1968, Ser. No. 730,646
Int. Cl. C07c *25/04*
U.S. Cl. 260—650                                          14 Claims

ABSTRACT OF THE DISCLOSURE

A process for preparing a nuclear chloro or nuclear bromo aromatic compound which involves heating an aromatic compound in the presence of a nitrate ion, a nitrite, ion, NO or $NO_2$, a chloride or bromoide ion, water and oxygen.

---

A halogenated aromatic selected from the group consisting of chloro aromatics and bromo aromatics can be obtained by a process which comprises heating an aromatic compound selected from the group consisting of an aromatic hydrocarbon and a halogenated aromatic hydrocarbon with a compound selected from the group consisting of copper, manganese, cerium, cobalt, vanadium, chromium, iron nickel, cadmium, tin, antimony, mercury, bismuth and the noble metals and compounds of these metals, a substance selected from the group consisting of nitrate ions, nitrite, ions, NO and $NO_2$, a halogen ion selected from the group consisting of chloride ions and bromide ions and an inert organic solvent.

We have found, unexpectedly, that in the above procedure the defined metal or metal compound and organic solvent can be eliminated, provided water and molecular oxygen are present, and the desired chloro aromatic or bromo aromatic will still be obtained. In other words our process involves heating an aromatic compound selected from the group consisting of an aromatic hydrocarbon and a halogenated aromatic hydrocarbon with a substance selected from the group consisting of nitrate ions, nitrite ions, NO and $NO_2$, a halogen ion selected from the group consisting of chloride ions and bromide ions, water and molecular oxygen. In this manner a simple and economic system is obtained, since the presence of the organic solvent and the metal or metal compound tends to give rise to difficult and serious recovery and purification problems.

The aromatic hydrocarbon reactant employed herein can be an aromatic hydrocargon or a halogenated (chloro, bromo, fluoro, or iodo) aromatic hydrocarbon. Examples of such aromatic hydrocarbons that can be employed herein include benzene, toluene, ethylbenzene, cumene, naphthalene, anthracene, biphenyl, phenanthrene, t-butylbenzene, α-phenylnaphthalene, para-xylene, polystyrene, terphenyl, 3-phenylheptane, 1,4-diphenyl butane, diphenyl methane, tetralin, propylium anion, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrate ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally there must be present in the reaction system chloride ions or bromide ions in sufficient quantities to halogenate the aromatic compound defined above. By "chloride ions or bromide ions" we mean a singly negatively charged chlorine or bromine atom. Desirably the chloride ion or bromide ion is obtained from any compound which is capable of dissociating in the reaction system to chloride or bromide ions, such as hydrogen chloride, hydrogen bromide, ammonium chloride, ammonium bromide, organic chlorides and bromides such as aniline hydrochloride, methyl amine hydrochloride, benzyl trimethyl ammonium bromide and metallic chlorides and bromides such as sodium chloride, potassium bromide, rubidium chloride, magnesium bromide, cupric chloride, barium chloride, calicum chloride, aluminum bromide, etc. Also present in the reaction system is water and molecular oxygen.

The reaction defined herein is simply effected by bringing the materials together into contact with each other under specified conditions. The amount of chloride or bromide ion present in the reaction system relative to the aromatic hydrocarbon reactant, on a molar basis, can be from about 10:1 to about 1:20, preferably from about 2:1 to about 1:2. The amount of nitrate ion, nitrite ion, NO or $NO_2$ employed, on a molar basis, relative to the aromatic compound, can be from about 1:1 to about 1:10$^6$, preferably from about 1:3 to about 1:10$^6$. On a molar basis, relative to the aromatic compound, water can be present in the range of about 1000:1 to about 0.1:1, preferably about 10:1 to about 2:1. The amount of molecular oxygen that con be employed relative to the aromatic compound reactant, on a molar basis, can be from about 1000:1 to about 1:10, preferably from about 10:1 to about 1:1. The temperature employed during the process can range from about 15° to about 200° C., preferably from about 60° to about 150° C., the pressure from about 0.1 to about 10,000 pounds per square inch gauge, preferably from about ten to about 1000 pounds per square inch gauge, but most preferably from about 50 to about 150 pounds per square inch gauge, and the contact time from about 0.0001 to about 200, preferably from about one to about ten hours.

At the end of the reaction period, the desired chloro or bromo aromatic compound can be recovered from the reaction mixture in any suitable manner, for example, by distillation at a temperature of about 50° to about 200° C. and a pressure of about 0.001 to about ten pounds per square inch gauge. Depending upon the boiling points of the products in the reaction mixture, the individual components thereof, including the desired chloro or bromo aromatic, will come off individually overhead and can thus be easily recovered.

The process of the invention can further be illustrated by the following.
A mixture of reactants, as set forth below in Table I, was heated in an atmosphere of oxygen. Analysis by gas chromatography resulted in data reproduced below in Table I.

TABLE I
Millimols of reactant

| Run No. | Palladium acetate | Cupric acetate | Water | Nitric acid | Hydrochloric acid | Hydrobromic acid | Oxygen [1] | Benzene | Toluene | Meta xylene | Para xylene | Mesitylene | Chlorobenzene |
|---|---|---|---|---|---|---|---|---|---|---|---|---|---|
| 1 | 4 | | 3,850 | 22.2 | 537 | | 172 | | 607 | | | | |
| 2 | 4 | | 3,850 | 22.2 | 537 | | 167 | | 607 | | | | |
| 3 | | | 3,850 | 22.2 | 537 | | 157 | | 607 | | | | |
| 4 | | | 3,850 | | 537 | | 4 | | 607 | | | | |
| 5 | | | 1,890 | 22.2 | 537 | | 237 | | 607 | | | | |
| 6 | 4 | | 1,890 | 22.2 | 537 | | 239 | | 607 | | | | |
| 7 | | | 3,850 | 22.2 | 537 | | 122 | 715 | | | | | |
| 8 | | 2 | 2,275 | 22.2 | 650 | | 177 | | | 500 | 500 | | |
| 9 | | 2 | 2,275 | 22.2 | 650 | | 199 | | | 500 | 500 | | |
| 10 | | 2 | 2,275 | 22.2 | 650 | | 221 | | | 500 | 500 | | |
| 11 | | | 3,440 | 22.2 | 500 | | 112 | | 600 | | | | |
| 12 | | 10 | 3,440 | 22.2 | 500 | | 149 | | 600 | | | | |
| 13 | | | 3,440 | 22.2 | 500 | | 135 | | 600 | | | | |
| 14 | | 10 | 3,440 | 22.2 | 500 | | 147 | | 600 | | | | |
| 15 | | | 1,720 | 22.2 | 500 | | 209 | | 600 | | | | |
| 16 | | 10 | 1,720 | 22.2 | 500 | | 221 | | 600 | | | | |
| 17 | | | 3,440 | 22.2 | 1,000 | | 180 | | 600 | | | | |
| 18 | | 10 | 3,440 | 22.2 | 1,000 | | 248 | | 600 | | | | |
| 19 | | 10 | 4,160 | 22.2 | 600 | | 170 | | 600 | | | | |
| 20 | | | | 2.4 | 68.5 | | 0 | | 1,473 | | | | |
| 21 | | 2 | | 2.4 | 46.6 | | 0 | | 1,473 | | | | |
| 22 | | 10 | | 2.4 | 65.8 | | 0 | | 1,522 | | | | |
| 23 | | | | 2.4 | 57.5 | | 0 | | | | | 1,155 | |
| 24 | | 2 | | 2.4 | 55 | | 0 | | | | | 1,155 | |
| 25 | | | 2,060 | 11.1 | 303 | | 268 | | | | | | 301 |

| Run No. | Temp., °C. | Pressure, p.s.i.g. | Time, hours | Mol percent of reactant aromatic converted to halogenated aromatic | | | | | |
|---|---|---|---|---|---|---|---|---|---|
| | | | | Benzene | Toluene | Meta xylene | Para xylene | Mesitylene | Chlorobenzene |
| 1 | 120 | 170 | 4 | | 53.5 | | | | |
| 2 | 120 | 170 | 3 | | 51.6 | | | | |
| 3 | 120 | 170 | 4.75 | | 37.5 | | | | |
| 4 | 120 | 170 | 1 | | None | | | | |
| 5 | 120 | 170 | 5.25 | | (2) | | | | |
| 6 | 120 | 170 | 5 | | (2) | | | | |
| 7 | 120 | 170 | 4.75 | 21.5 | | | | | |
| 8 | 90 | 100 | 5.7 | | | 57 | 6 | | |
| 9 | 90 | 100 | 5.7 | | | 61 | 14 | | |
| 10 | 90 | 100 | 5.3 | | | 67 | 13 | | |
| 11 | 120 | 150 | 3 | | 51.8 | | | | |
| 12 | 120 | 150 | 1.5 | | 58.5 | | | | |
| 13 | 150 | 150 | 1 | | 54.6 | | | | |
| 14 | 150 | 150 | 1 | | 66.0 | | | | |
| 15 | 120 | 150 | 4.75 | | 69.5 | | | | |
| 16 | 120 | 150 | 4.50 | | 73.2 | | | | |
| 17 | 120 | 150 | 5 | | 59.3 | | | | |
| 18 | 120 | 150 | 5 | | 75.4 | | | | |
| 19 | 120 | 150 | 1.25 | | 52.0 | | | | |
| 20 | 120 | 170 | 4 | | None | | | | |
| 21 | 120 | 170 | 4 | | None | | | | |
| 22 | 120 | 170 | 4 | | None | | | | |
| 23 | 70 | 100 | 4 | | | | | None | |
| 24 | 70 | 100 | 4 | | | | | None | |
| 25 | 80 | 170 | 5 | | | | | | 90 |

[1] Values represent millimols of oxygen reacted as determined by pressure drop in system.
[2] Denotes no analysis made.

The data in Table I amply demonstrate the uniqueness of our process. Note that in each of Runs Nos. 3, 5, 7, 11, 13, 15 and 17 a halogenated aromatic hydrocarbon was produced when only water, a nitrate ion, a halogen ion and oxygen were present in the reaction system with the reactant aromatic. Although in Run No. 5 no analysis was made of product the large consumption of oxygen proves that halogenation of the aromatic compound took place. Runs Nos. 1, 2, 6, 8, 9, 10, 12, 14, 16, 18 and 19 show that a metal or metal compound known to be useful in the halogenation of an aromatic compound can also be present, but Runs Nos. 3, 5, 7, 11, 13, 15 and 17 show that such halogenation will proceed without the presence of the same. Similarly, in Run No. 6, no analysis was made of product, but the large amount of oxygen consumed proves that halogenation of the aromatic compound took place. Run No. 4 shows that the reaction will not proceed in the absence of the nitrate ion, while each of Runs 20 to 24 shows the necessity of water in the system.

Obviously, many modifications and variations of the invention, as hereinabove set forth, can be made without departing from the spirit and scope thereof, and therefore only such limitations should be imposed as are indicated in the appended claims.

We claim:

1. A process for preparing a halogenated aromatic hydrocarbon selected from the group consisting of chloro aromatic and bromo aromatic hydrocarbons which comprises heating an aromatic compound selected from the group consisting of an aromatic hydrocarbon and a halogenated aromatic hydrocarbon with (1) a substance selected from the group consisting of nitrate ions, nitrite ions, NO and $NO_2$ (2) a halogen ion selected from the group consisting of chloride ions and bromide ions, (3) water, and (4) molecular oxygen, wherein the temperature employed is from about 15° to about 200° C., the pressure from about 0.1 to about 10,000 pounds per square inch gauge and the contact time about 0.001 to about 200 hours, with the amount of chloride or bromide ion present relative to the aromatic hydrocarbon reactant, on a molar basis, being from about 10:1 to about 1:20, the amount of nitrate ion, nitrite ion, NO or $NO_2$ on a molar basis, relative to the aromatic compound being from about 1:3 to about $1:10^6$, the amount of water on a molar basis, relative to the aromatic compound being in the range of about 1000:1 to about 0.1:1, and the amount of molecular oxygen relative to the aromatic compound, on a molar basis, being about 1000:1 to about 1:10.

2. The process of claim 1 wherein said aromatic compound is an aromatic hydrocarbon.

3. The process of claim 1 wherein said aromatic compound is benzene.

4. The process of claim 1 wherein said aromatic compound is toluene.

5. The process of claim 1 wherein said aromatic compound is xylene.

6. The process of claim 1 wherein said aromatic compound is mesitylene.

7. The process of claim 1 wherein said aromatic compound is chlorobenzene.

8. The process of claim 1 wherein said chloride ions are obtained from HCl.

9. The process of claim 1 wherein said bromide ions are obtained from HBr.

10. The process of claim 1 wherein said nitrate ions are obtained from $HNO_3$.

11. The process of claim 1 wherein said nitrate ions are obtained from $NaNO_3$.

12. The process of claim 1 wherein said substance is $NO_2$.

13. The process of claim 1 wherein said substance is NO.

14. The process of claim 1 wherein the temperature employed is from about 60° to about 150° C., the pressure from about ten to about 1000 pounds per square inch gauge and the contact time about one to about ten hours, with the amount of chloride or bromide ion present relative to the aromatic hydrocarbon reactant, on a molar basis being from about 2:1 to about 1:2, the amount of nitrate ion, nitrite ion, NO or $NO_2$, on a molar basis, relative to the aromatic compound being from about 1:3 to about $1:10^6$, the amount of water, on a molar basis, relative to the aromatic compound being in the range of about 10:1 to about 2:1 and the amount of molecular oxygen relative to the aromatic compound, on a molar basis, being about 10:1 to about 1:1.

References Cited

UNITED STATES PATENTS

| | | | |
|---|---|---|---|
| 2,152,357 | 3/1939 | Moyer | 260—650 |
| 2,174,574 | 10/1939 | Fogler | 260—650X |
| 3,160,653 | 12/1964 | Benning et al. | 260—650X |
| 3,214,481 | 10/1965 | Heinemann et al. | 260—650X |
| 3,214,482 | 10/1965 | Caropreso et al. | 260—650X |

HOWARD T. MARS, Primary Examiner

U.S. Cl. X.R.

260—649R, 649DP

PO-1050
(5/69)

UNITED STATES PATENT OFFICE
CERTIFICATE OF CORRECTION

Patent No. 3,591,644   Dated July 6, 1971

Inventor(s) Vincent A. Notaro and Charles M. Selwitz

It is certified that error appears in the above-identified patent and that said Letters Patent are hereby corrected as shown below:

Claim 1, column 4, line 55, "0.001 to about 200" should read "0.0001 to about 200".

Signed and sealed this 16th day of November 1971.

(SEAL)
Attest:

EDWARD M. FLETCHER, JR.  ROBERT GOTTSCHALK
Attesting Officer         Acting Commissioner of Patents